US010582190B2

(12) United States Patent
High et al.

(10) Patent No.: US 10,582,190 B2
(45) Date of Patent: *Mar. 3, 2020

(54) VIRTUAL TRAINING SYSTEM

(71) Applicant: Walmart Apollo, LLC, Bentonville, AR (US)

(72) Inventors: Donald High, Noel, MO (US); John Paul Thompson, Bentonville, AR (US); David Winkle, Bella Vista, AR (US); Robert C. Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 523 days.

This patent is subject to a terminal disclaimer.

(21) Appl. No.: 15/355,879

(22) Filed: Nov. 18, 2016

(65) Prior Publication Data
US 2017/0150127 A1   May 25, 2017

Related U.S. Application Data

(60) Provisional application No. 62/258,792, filed on Nov. 23, 2015.

(51) Int. Cl.
*H04N 13/261* (2018.01)
*H04N 13/383* (2018.01)
(Continued)

(52) U.S. Cl.
CPC .......... *H04N 13/271* (2018.05); *G06F 3/005* (2013.01); *G06F 3/011* (2013.01); *G06F 3/012* (2013.01);
(Continued)

(58) Field of Classification Search
CPC .................................................... H04N 13/271
See application file for complete search history.

(56) References Cited

U.S. PATENT DOCUMENTS 8,204,299 B2   6/2012   Arcas
8,788,197 B2   7/2014   Fink
(Continued)

FOREIGN PATENT DOCUMENTS

| GB | 2543913 | 5/2017 |
| WO | 02069272 | 9/2002 |
| WO | 2015172227 | 11/2015 |

OTHER PUBLICATIONS

Here's How Microsoft is Making 3D Videos for HoloLens, by Levi Sharpe Posted Jul. 29, 2015.
(Continued)

*Primary Examiner* — Irfan Habib
(74) *Attorney, Agent, or Firm* — Fitch, Even, Tabin & Flannery, LLP

(57) ABSTRACT

A virtual training system includes a 3D scanner in recording space and a camera. A scan of the recording space are received and combined to make a sequence of models of the recording space while a tasks is being performed. The model states are presented in sequence to a trainee in a playback space and the actions of the trainee are detected. Deviation of the trainee or objects in the playback space from the trainer and objects in the recording space may be detected and alerts generated. Scanning of the recording space may be accelerated by making a full scan followed by partial scans. The partial scans may be performed in response to detected movement.

18 Claims, 6 Drawing Sheets

(51) Int. Cl.
| | |
|---|---|
| *G09B 19/00* | (2006.01) |
| *H04N 13/271* | (2018.01) |
| *H04N 13/344* | (2018.01) |
| *G06F 3/03* | (2006.01) |
| *G06F 3/01* | (2006.01) |
| *G06F 3/00* | (2006.01) |
| *G09B 9/00* | (2006.01) |

(52) U.S. Cl.
CPC ............ *G06F 3/016* (2013.01); *G06F 3/0304* (2013.01); *G09B 9/00* (2013.01); *G09B 19/00* (2013.01); *H04N 13/261* (2018.05); *H04N 13/344* (2018.05); *H04N 13/383* (2018.05); *G06T 2207/10016* (2013.01); *G06T 2207/10028* (2013.01)

(56) References Cited

U.S. PATENT DOCUMENTS

| | | | | |
|---|---|---|---|---|
| 8,963,916 | B2 | 2/2015 | Reitan | |
| 8,965,460 | B1 | 2/2015 | Rao et al. | |
| 9,161,019 | B2* | 10/2015 | Millett | G01S 17/89 |
| 9,208,571 | B2* | 12/2015 | Evertt | H04N 5/2226 |
| 9,519,972 | B2* | 12/2016 | Venkataraman | G06T 7/557 |
| 9,654,734 | B1* | 5/2017 | High | H04N 13/344 |
| 9,800,856 | B2* | 10/2017 | Venkataraman | G06T 7/557 |
| 2005/0083248 | A1 | 4/2005 | Biocca | |
| 2008/0266294 | A1* | 10/2008 | Osman | G01B 11/2513 |
| | | | | 345/426 |
| 2009/0119604 | A1* | 5/2009 | Simard | G06Q 10/10 |
| | | | | 715/757 |
| 2013/0162632 | A1* | 6/2013 | Varga | G06T 19/006 |
| | | | | 345/419 |
| 2013/0307855 | A1 | 11/2013 | Lamb | |
| 2014/0049559 | A1 | 2/2014 | Fleck | |
| 2014/0078137 | A1* | 3/2014 | Peddi | G09B 19/0038 |
| | | | | 345/419 |
| 2014/0176661 | A1 | 6/2014 | Reina | |
| 2014/0232816 | A1* | 8/2014 | Wilson | H04N 7/157 |
| | | | | 348/14.08 |
| 2014/0316611 | A1* | 10/2014 | Parente Da Silva | G06K 9/52 |
| | | | | 701/2 |
| 2014/0361956 | A1* | 12/2014 | Mikhailov | G02B 27/0179 |
| | | | | 345/8 |
| 2015/0002541 | A1* | 1/2015 | Dillavou | G06T 19/006 |
| | | | | 345/633 |
| 2015/0213650 | A1* | 7/2015 | Barzuza | G06T 19/006 |
| | | | | 348/14.07 |
| 2015/0245017 | A1* | 8/2015 | Di Censo | G02B 27/0101 |
| | | | | 348/51 |
| 2016/0343164 | A1* | 11/2016 | Urbach | G06T 19/006 |
| 2016/0360970 | A1* | 12/2016 | Tzvieli | G01J 5/0265 |
| 2016/0364015 | A1* | 12/2016 | Send | G01S 17/32 |
| 2017/0094227 | A1* | 3/2017 | Williams | G06F 3/011 |
| 2017/0127023 | A1* | 5/2017 | High | H04N 13/344 |
| 2017/0178392 | A1* | 6/2017 | Zuccarino | G06T 15/205 |
| 2017/0272726 | A1* | 9/2017 | Ovsiannikov | G01C 11/30 |
| 2018/0130255 | A1* | 5/2018 | Hazeghi | H04N 13/243 |
| | | | | 13/243 |
| 2018/0205926 | A1* | 7/2018 | Mogalapalli | G06T 7/521 |
| 2018/0270474 | A1* | 9/2018 | Liu | G06K 9/00201 |
| 2018/0322708 | A1* | 11/2018 | Luccin | G06T 19/20 |

OTHER PUBLICATIONS

Microsoft HoloLens: Everything you need to know about the $3,000 AR headset.
Experience Microsoft HoloLens https://www.microsoft.com/microsofthololens/enus/experience.
zSpace zSpace—Product Webpage.
UKIPO; App. No. GB1619734.5; Combined Search and Examination Report dated May 17, 2017.
UKIPO; App. No. GB1619734.5; Examination Report under Section 18(3) dated Apr. 11, 2019.

* cited by examiner

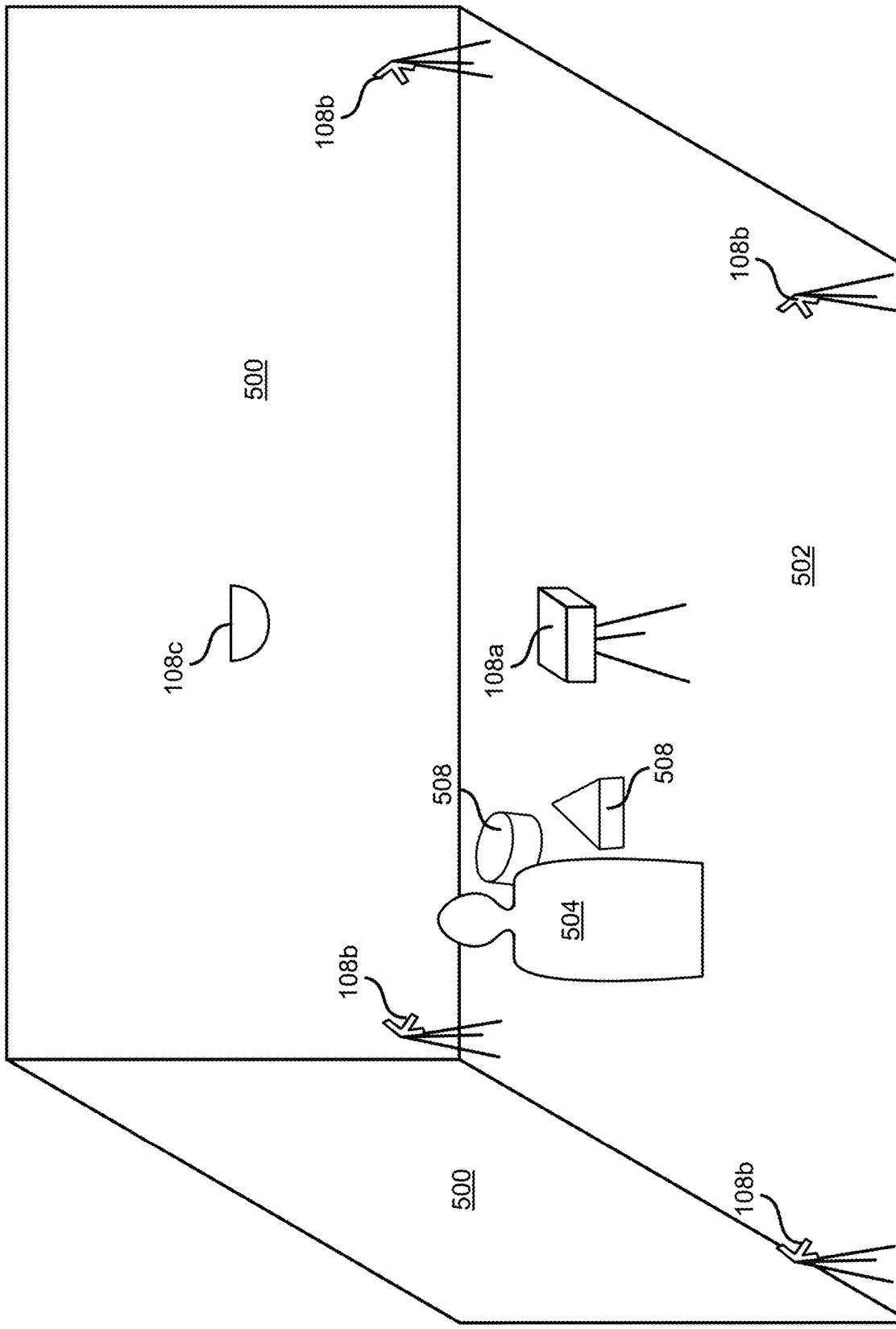

VIRTUAL TRAINING SYSTEM

CROSS-REFERENCE TO RELATED APPLICATIONS

This application claims the benefit of U.S. Provisional Patent Application 62/258,792 filed Nov. 23, 2015, and titled "Virtual Training System", the entire contents of which are hereby incorporated herein by reference.

BACKGROUND

Field of the Invention

This invention relates to systems and methods for providing virtual reality experiences.

Background of the Invention

The cost and time required to train employees is very high. Particularly, for complex tasks, a trainer may need to demonstrate an activity, observe a trainee performing the activity, and make corrections. Where a large number of employees must be trained, this may result in many of the most experienced employees being taken away from production activities.

The systems and methods disclosed herein provide an improved approach for performing training using virtualization technologies.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 5A and 5B are diagrams illustrating the recording and playing back of virtualized training in accordance with an embodiment of the present invention.

DETAILED DESCRIPTION

Figure 1:
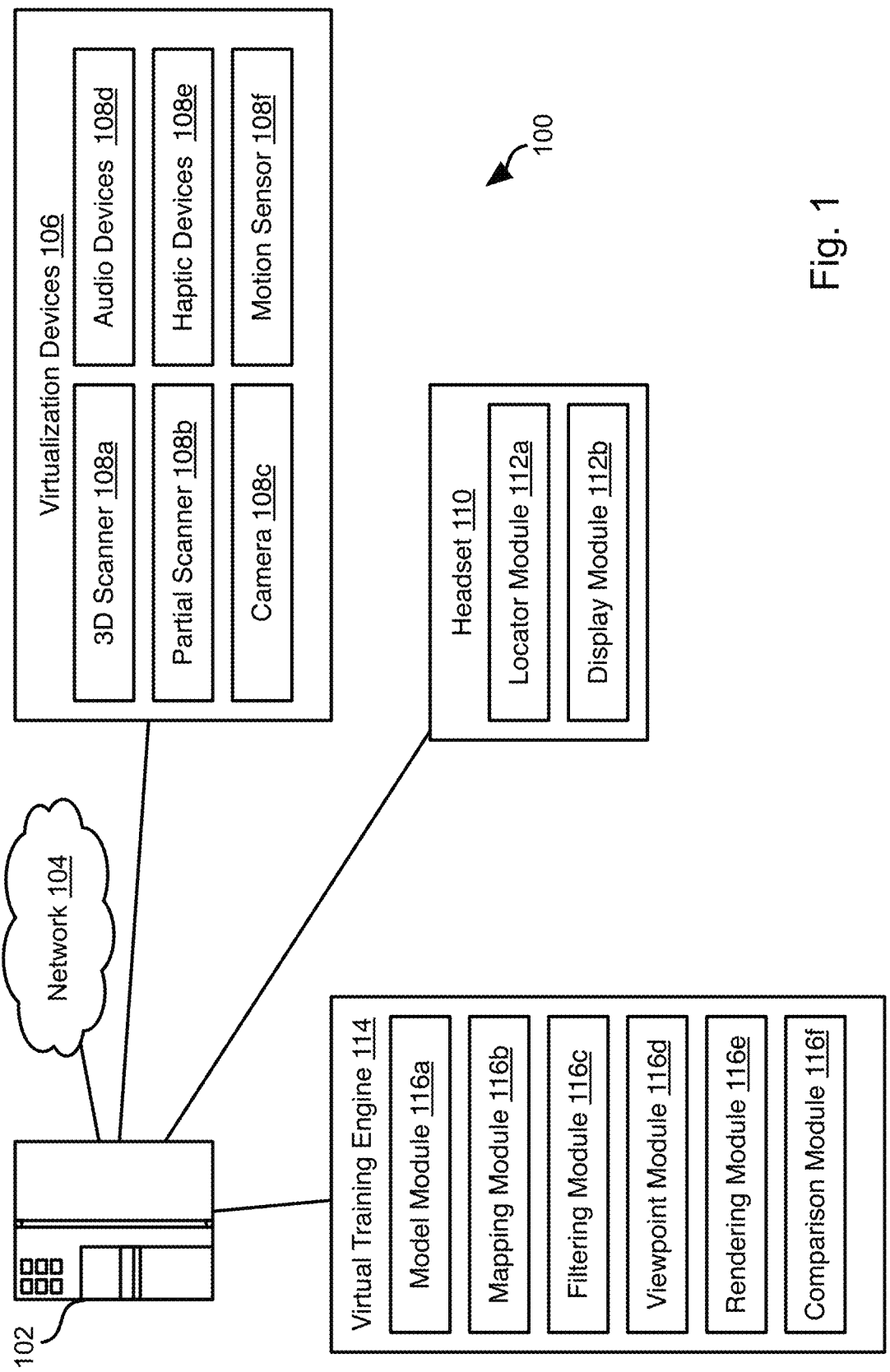
FIG. 1 is a schematic block diagram of a network environment suitable for implementing embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a network environment 100 may be used to implement methods as described herein. The environment 100 may include a server system 102 associated with one or both a trainer recording an activity and a trainee viewing a virtual representation of the activity. Alternatively, separate server systems 102 may be remote from one another with the trainer and trainee each interacting with a separate server system 102, the separate server systems 102 communicating with one another by means of a network 104. The network 104 may be a local area network (LAN), wide area network (WAN), the Internet, or any other type of network.

The methods disclosed herein may require large amounts of computing resources, accordingly the server system 102 preferably has multiple processors and networking bandwidth sufficient to receive, transmit, and process the virtual conferencing data according to the methods disclosed herein.

The systems disclosed herein may record content in a recording space and playback that content in a playback space. The recording and playback space may be the same or difference spaces and may use the same or different virtualization devices 106. The virtualization devices 106 perform sensing of the space for virtualization elsewhere and/or for virtualizing a recorded space in the space. For example, the virtualization devices 106 may include a three-dimensional (3D) scanner 108a. The 3D scanner 108a may advantageously be a laser scanner capable of performing a 360-degree scan of a space. For example, the 3D scanner 108a may be embodied as the FARO FOCUS 3D laser scanner or other type of laser scanner.

The virtualization devices 106 may further include partial scanners 108b. The partial scanners 108b may have a smaller field of view than the 3D scanner 108a but provide faster processing times to obtain a 3D model using captured data. For example, the partial scanners 108b may be optical scanners. In some embodiments, multiple partial scanners 108b are used such that the combined fields of view of the partial scanners 108b are equal to all or substantially all (e.g., 90%) of the field of view of the 3D scanner. In some embodiments, the partial scanners 108b are embodied as the FARO FREESTYLE3D SCANNER or some other optical 3D scanner known in the art.

The virtualization devices 106 may include one or more video cameras 108c. The video cameras 108c may be positioned and oriented to capture images of the same local region as the 3D scanner 108a and partial scanners 108b. The images captured by the cameras 108c may then be mapped to three-dimensional point clouds measured using the scanners 108a, 108b to generate a three-dimensional model of the local region that overlays image date over the point cloud thereby providing a visually authentic representation of the local region. The manner in which the three-dimensional point clouds and image data is combined may be performed according to any method known in the art.

The virtualization devices 106 may include audio devices 108d, including a microphone for detecting sound in the local region and speakers for playing back sounds recorded in a remote region.

The virtualization devices 106 may include haptic devices 108e, including a haptic feedback device, such as a glove that is capable of one or both of detecting contact of an object with the glove and simulating contact with the glove. The haptic devices 108e may include any haptic glove or other haptic feedback device known in the art.

The virtualization devices 106 may include one or more motion sensors 108f. In particular, the motion sensors 108f may perform one or both of the following functions. First, the motion sensors 108f may sense motion in a fields of view of the partial scanner 108b. The partial scanner 108b or server system 102 may be programmed to invoke performing a partial scan by a partial scanner 108b in response to the sensing of motion in the field of view thereof by one of the motion sensors 108f. In this manner, the amount of computing resources required to generate a three-dimensional model of a space is reduced. Second, the motion sensors 108f may sense movement of a trainee, i.e. a trainee's hand, arm, leg, or other body part or movement of an object being manipulated by the trainee for use in comparing the movements to the recorded movements of a trainer or object manipulated by the trainer.

A virtual reality headset 110 may also be coupled to the server system 102 for use in the playback space. In some embodiment, a virtual reality headset is not used in the recording space. The headset 110 may include any virtual reality headset known in the art such as the OCCULUS RIFT, MICROSOFT HOLOLENS, ZEISS VR ONE, GOOGLE CARDBOARD, and the like. The virtual reality headset 110 may include a locator module 112a including any location mechanism known in the art to determine the location and orientation of the headset 110 in the local region. For example, the headset 110 may include a GPS receiver, compass, accelerometer, or other device enabling the headset 110 to detect its position and orientation and/or changes in its position and orientation. In some embodiments, the viewpoint of the headset 110 may be determined from an image detected using a camera attached to the headset 110 (such as LA FORGE OPTICAL) The headset 110 may also have one or more optically-recognizable targets affixed thereto that enable determination of the position and orientation of the headset 110 using one or more cameras (e.g. images captured using video cameras 108c). The position and orientation (hereinafter "viewpoint") of the headset 110 may be transmitted to the server system 102, which will then render images of a model according to the user's viewpoint in the local region.

The headset 110 may further include a display module 112b. As known in the art, a virtual reality headset 110 presents two images of a scene from two different viewpoints, e.g. from a left eye and a right eye. These two images are presented simultaneously to the right and left eye, which the brain will then interpret as viewing of a three-dimensional scene. Accordingly, the display module 112b may receive a stream of image pairs and display each pair of images to the wearer of the headset 110. The image pairs may be received from the server system 102. Alternatively, the server system 102 may transmit a model to the headset 110, which then determines the headset's position and orientation and renders the two images based on the model.

The server system 102 may execute or access a virtual training engine 114. The virtual training engine 114 may include a model module 116a programmed to periodically receive point clouds from one or both of the 3D scanner 108a and partial scanner 108b and from the video camera 108c. The model module 116a then combines these to generate a model of the local region that simulates both the 3D shape of objects in the local region as well as their visual appearance (e.g. color). As described in greater detail below, the partial scanners 108b may provide scans more often than the 3D scanner 108a and the outputs of the partial scans may be used to update a model created using a point cloud from the 3D scanner 108a.

The virtual training engine 114 may include a mapping module 116b. The mapping module 116b maps at least one of a point and two or more dimensions in the recording space to a point and one or more dimensions in the playback space. In particular, the model created by the model module 116a may define a recording coordinate space. The mapping module 116b maps the coordinate space of the playback region to a coordinate space of the model generated of the recording space. The mapping may be accomplished by relating a single point in the recording coordinate space to a single point in the playback coordinate space. The mapping may further include mapping two dimensions (e.g. vertical and horizontal) in the playback space to corresponding dimensions in the recording coordinate space. In this manner, each point in the recording coordinate space may then be related to or translated to a position in the playback coordinate space and vice-versa. As noted above, the playback and recording spaces may be the same, such that no translation is required.

The reference points may be specified by users of the system, e.g. by placing an optically recognizable target or a target having a recognizable 3D shape that is detected automatically in the model of the local region. The reference points may be specified manually by a user selection using a pointing device of a point in the models of the recording and playback spaces. The reference points may be automatically selected by analyzing the model of the recording and playback spaces, e.g. a corner where the floor and two walls meet may be selected automatically as the reference point for a space.

The virtual training engine 114 may include a filtering module 116c. In some embodiments, the model generated by the model module 116a may be processed to remove objects that are not relevant. For example, walls, floors, and ceilings may be removed from the model to obtain a filtered model. The filtered model may then be displayed in the playback space, thereby reducing the amount of data required to be stored and processed during playback. In some embodiments, the filtering module 116c may be programmed to receive user selection of objects and remove the selected objects from the model.

The virtual training engine 114 may include a viewpoint module 116d. The viewpoint module 116d determines and current viewpoint of the headset 110 and relates this viewpoint to the model. Specifically, the location and orientation of the headset 110 as determined using the locator module 112a is mapped by the viewpoint module 116d to a position and orientation within the playback coordinate space. Using the mapping module 116b, the position and orientation of the headset 110 is also determined with respect to the playback coordinate space.

The virtual training engine 114 may include a rendering module 116e. The rendering module 116e generates image pairs for display in the headset 110. The image pairs are images of the model viewed from the point of view determined by the viewpoint module 116e. The rendering module 116e may incorporate people and objects from a model of the playback space.

The virtual training engine 114 may include an comparison module 116f. The comparison module 116f detects movements of the hands, other body parts, or objects within the recording and/or playback spaces, such as using an optical motion sensing system (e.g. MICROSOFT KINECT) or accelerometer-based motion sensing system worn by the user or connected to an object. Motion may also be sensed by analysis of the 3D model of the recording/and or playback space. Specifically, the model of the recording and playback space may be one of a sequence of models generated periodically and/or in response to detected motion. Accordingly, changes between consecutive models may be detected and analyzed to detect movement.

Motion of the trainer is then compared with that of the trainee. In particular, sensed movements of the trainer's hands or an object may be compared to sensed movements of the trainee's hands or an object in the playback space. If the difference exceeds some tolerance, then an alert may be generated, the difference may be recorded for later review, or feedback may be provided to the trainee, such as in the form of an output of the haptic device 108e.

Figure 2:
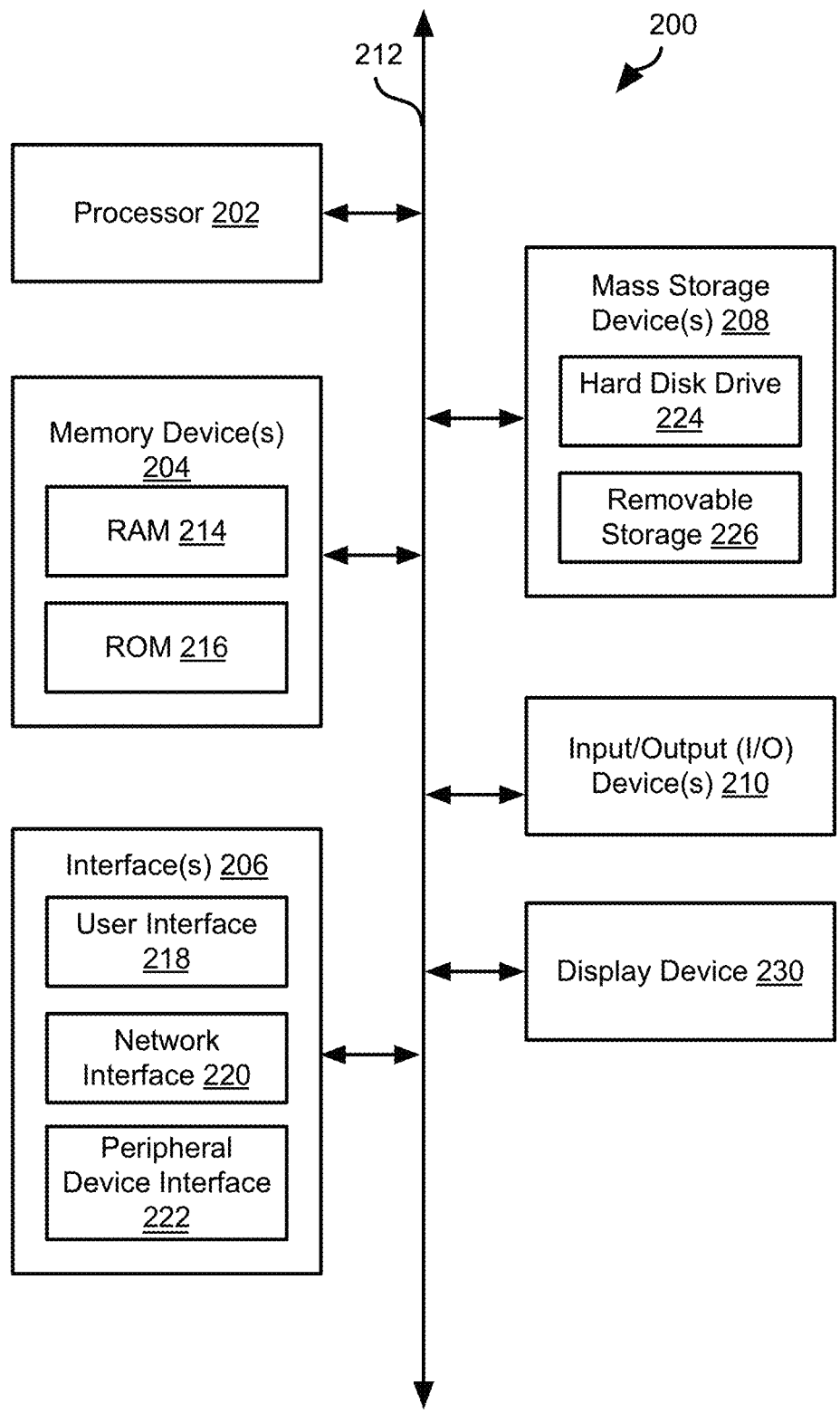
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The server system 102, virtualization devices 106, and headset 110 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, a tablet computer and the like. A server system 102 may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
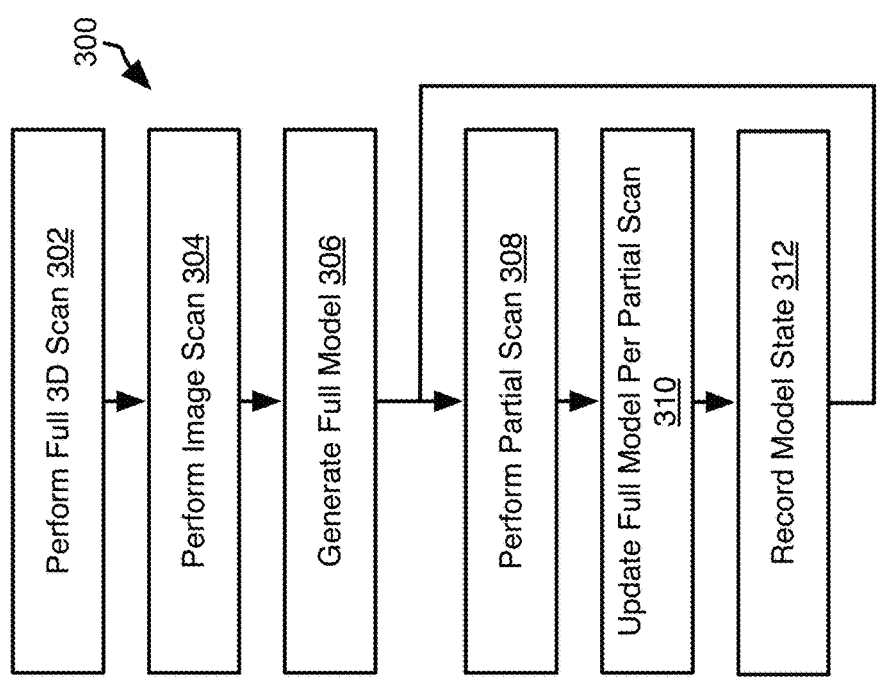
FIG. 3 is a process flow diagram of a method for scanning a space in accordance with an embodiment of the invention.

Referring to FIG. 3, the illustrated method 300 may be executed by the server system 102 to generate a model of the recording space. The method 300 may also be used to detect movement of trainee in the playback space. The method 300 may include performing 302 a full 3D scan with the 3D scanner 108a. Although the scanner 108a is referenced throughout in the singular, in some embodiments the full 3D scan of step 302 may be performed by multiple scanners 108a. Accordingly, references herein to the scanner 108a may be interpreted as including one scanner 108a or multiple scanners 108a.

Performing a full scan may include scanning a complete field of view of the 3D scanner 108a although this may not include an entire room or local region in which the 3D scanner 108a is located. The result of the scan 302 may be a point cloud received by the server system 102 from the scanner 108a, including a set of three-dimensional coordinates measured using the scanner 108a. The coordinates may be defined with respect to a scanner coordinate space and may be retained in that coordinate space or transformed to a different coordinate space.

The method 300 may further include performing an image scan 304, i.e. taking one or more images of the local region using one or more cameras 108c. The fields of view of the one or more cameras 108c preferably overlap substantially all (e.g. 90%) of the field of view of the scanner 108a.

The method 300 may include generating a model 306 using the full scan of step 302 and the image scan 304. As noted above, this may include wrapping or overlaying the images of step 304 over the point cloud obtained from step 302 in order to obtain a model that has both the three-dimensional attributes of the point cloud and the visual attributes (e.g. color) of the images. The manner in which the point cloud and images are combined may be performed using any method known in the art.

The method 300 may further include periodically performing 308 partial scans and updating 310 the model from step 306 according to the partial scans. Performing 308 the partial scans may include performing partial scans using the partial scanners 108b. The partial scanners 108b may be optical scanners or may output a point cloud that can be combined with image data to create a model. In such embodiments, performing 308 partial scans may include taking one or more pictures of the field of view of the partial scanners 108b and combining them to create the partial model. The partial scans may be performed 310 periodically according to a predetermined rate or may be performed in response to sensing of motion in the field of view of the partial scanner 108b, such as using a motion sensor coupled to the partial scanner 108b or server system 102.

The result of the partial scan 308 is a partial model in a partial coordinate space of the partial scanner 108b. This partial model may be transformed to the coordinate space of the full model and added to the full model 306. For example, a partial scanner 108b may have a volume of the local region in its field of view. Accordingly, the full model may be updated 310 by replacing the portion of the full model corresponding to this volume with the partial model. Updating 310 the full model may include wrapping the portion of the full model corresponding to the partial model with image data captured using the camera 108c at or near (e.g. within 1-100 ms) of the performance of the partial scan.

The mapping of the partial coordinate space to the scanner coordinate space may be performed based on prior calibration of the partial scanner 108b and 3D scanner 108a. Specifically, a target or other object may be placed in the local region and detected using both scanners 108a, 108b. By transforming the location of the object in the partial coordinate space to the location of the object in the scanner coordinate space, the transformation required to map one coordinate space to the other may be determined.

Steps 308, 310 may be repeated periodically throughout a virtual conference. In some embodiments, full scans using the 3D scanner 108 may also be performed periodically but at a slower rate than the partial scans.

As noted above, actions in the recording space may be recorded for training purposes. Accordingly, the method 300 may further include recording 312 a model state periodically or in response to each partial scan 308. Recording 312 the model state may include recording the entire model, i.e. the updated full model at step 310, or just the updates to the full model, thereby reducing storage requirements. Where only partial updates are stored, the step of updating 310 the full model may be omitted. The full model generated at step 306 may also be stored as the first model state in a sequence of model states.

In some embodiments, the model state stored at step 312 is a filtered model state. In particular, representations of non-relevant structures such as wall, ceilings, floors, the scanners themselves, and the like may be removed from the model in order to reduce storage space and cluttering of the model during playback.

Figure 4:
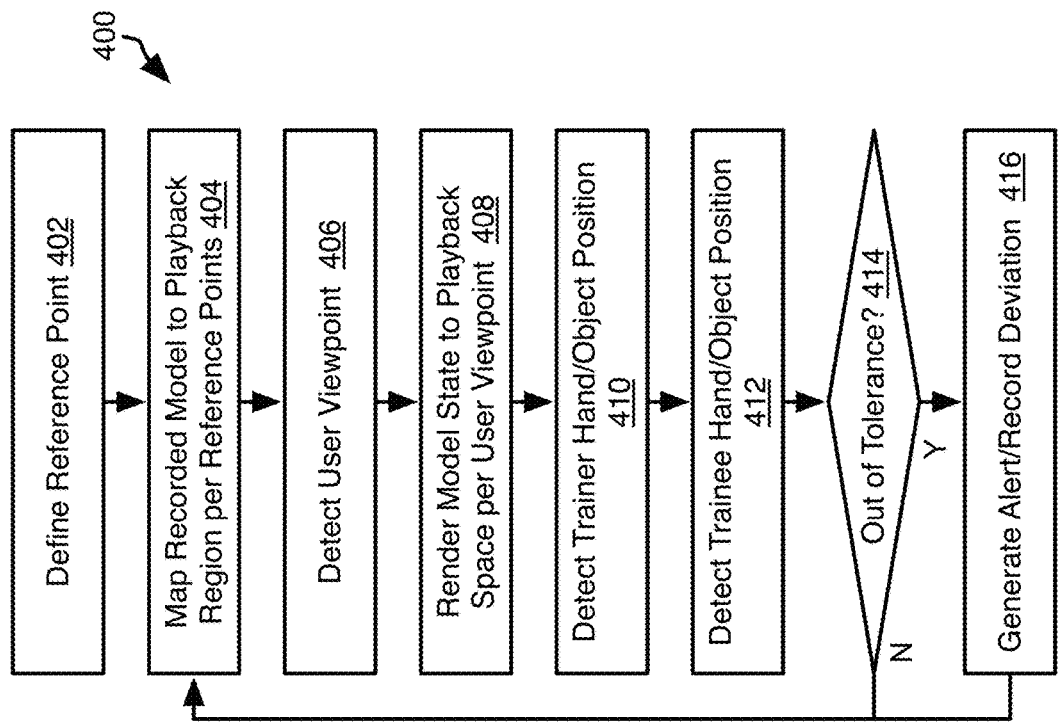
FIG. 4 is a process flow diagram of a method for conducting training in accordance with an embodiment of the present invention.

Referring to FIG. 4, the illustrated method 400 may be executed by a server system 102 to playback recorded model states according to the method 300. The method 400 may be performed using the same virtualization devices 106 by the same server 102 or using a different server and virtualization devices. Some or all of the steps of the method 400 may be executed for each model state recorded 312 as part of the method 300 in the recording space.

The method 400 may include defining 402 a reference point. This may include receiving or selecting a point in the playback space and retrieving a pre-defined reference point for the recording space. The reference points may be defined as three-dimensional coordinates. The reference point for the playback space may be a point in the scanner coordinate space and the reference point for the recording region may be coordinates in scanner coordinate spaces of scanners located in the recording space.

Some or all of steps 404-416 may be performed for each model state in a series of model states recorded in the recording space. In some embodiments, step 402 is not performed for each model state inasmuch as the same reference point is used for each model state.

The method 400 may include mapping 404 the model state to the playback space. In particular using the playback reference point and recording reference point, the transformation required to transform the remote reference point to the local reference may be applied to the model state to map 404 it to the playback coordinate space to obtain a transformed model state. As noted above, where the recording and playback space are the same, no transformation may be needed.

The method 400 may further include detecting 406 the viewpoint of one or more users in the local region. This may include detecting the viewpoint of one or more headsets 110 in the local region as discussed above. The transformed model is then rendered 408 for the users in the local region according to the viewpoints detected at step 414. A pair of images of the model state as viewed from the viewpoint of step 406 is generated, the pair of images being rendered from slightly different viewpoints corresponding to a viewer's right and left eyes. This pair of images is then sent to the headset 110 and displayed by the headset 110.

In some embodiments, the actions of a trainee wearing the headset 110 may be compared to those of a trainer performing activities in the recording space when the model states were recorded.

Accordingly, the method 400 may further include, for each model state, detecting 410 the position of a hand of the trainer or object in the model state. For example, in the point cloud representing the model state, a set of points shaped like a hand or specific object may be detected. Alternatively, for each model state, positions of the trainer's hands or the specific object may be detected and recorded separately, such as using the motion sensors 108f described above.

The method 400 may further include, for each model state, detecting 412 the position of a hand or object in the playback space. The position of the hand or object may be detected in the same manner as for step 410.

The method 400 may further include comparing the position detected at step 410 to the position detected at step 412. If the positions are found 414 to be different from one another by a specified tolerance, then an alert may be generated 416 and/or the deviation may be recorded for later review. Generating an alert may include generating an audible alert in the playback space or causing the haptic device 108e to produce a palpable signal.

Steps 410-414 may be performed for each model state while the trainee is in the playback space. Alternatively, the movements of the trainee may be recorded using one or both of the scanners 108a, 18b and the motion sensors 108f. Steps 410-414 may then be performed after playback has ended by comparing the recordings of the trainer and trainee.

In some embodiments, for each model state, a trainee model state is also recorded such that simultaneous playback of both states may be performed to enable comparison. Generating the trainee model states may be performed using the method 300 of FIG. 3.

Figure 5B:
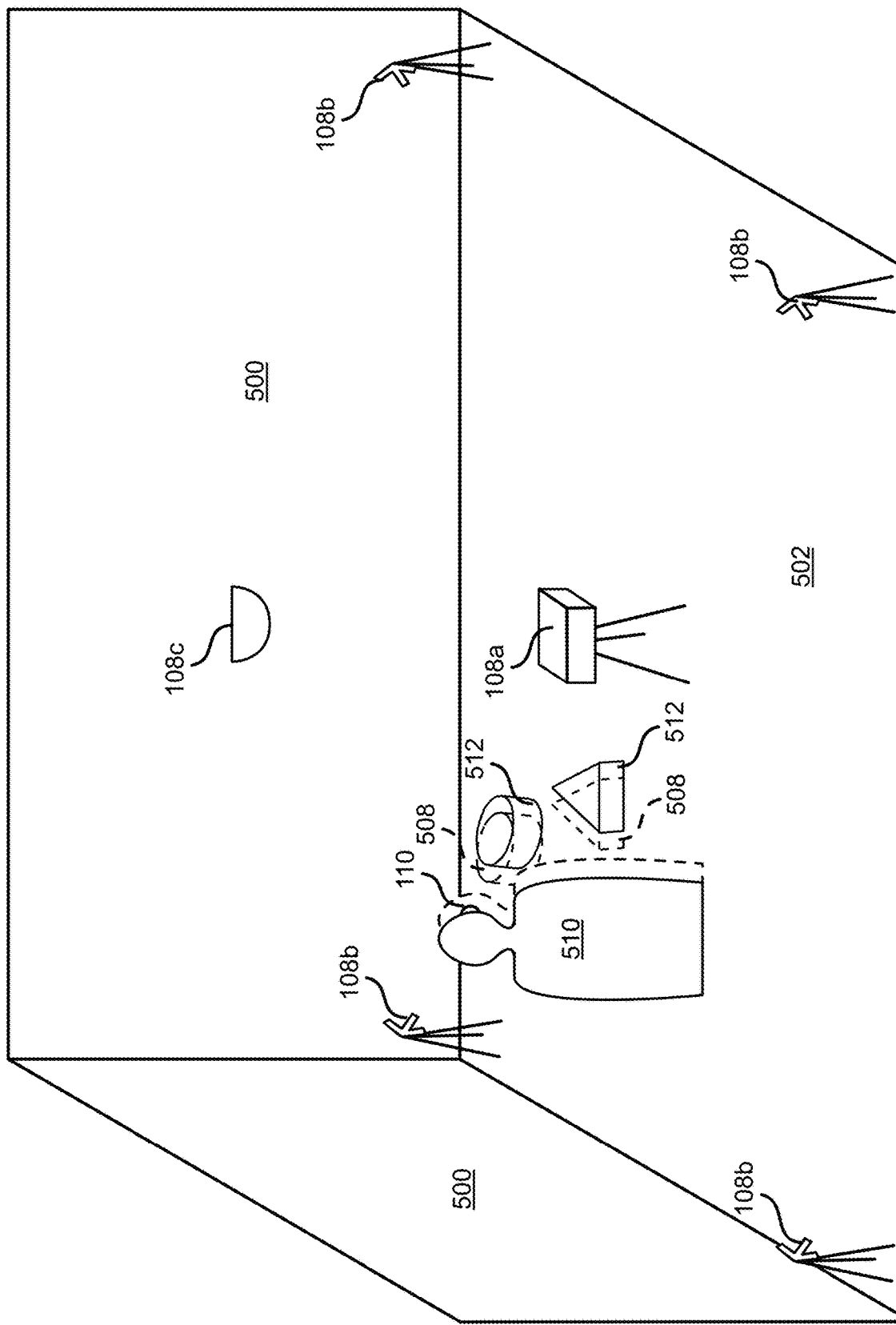

FIG. 5A illustrates a recording space with equipment and a trainer present and FIG. 5B illustrates the playback space. As is apparent, the scanners 108a, 108b are arranged in the room to scan some or all of the room. Although the recording and playback spaces are enclosed spaces in this example, open outdoor spaces or large indoor spaces exceeding the range if other scanners 108a, 108b may also be used. Accordingly, the recording and playback spaces may simply be defined as the space that is scanned by both types of scanners 108a, 108b.

The camera 108c may be located in the region. As noted above, the camera 108c may include multiple cameras. Multiple cameras 108c may be arranged around the recording space, and possibly the playback space, in order to capture substantially all of the fields of view of the scanner 108a and scanners 108b. In the illustrated embodiment, the camera 108c is a 360-degree camera mounted in an elevated position within the space. The camera 108c may be a video camera.

The walls 500 and floor 502 of the local region may be in the field of view of some or all of the scanners 108a, 108b but removed from any model transmitted for display in the remote region.

A trainer 504 is located within the recording space. Objects 508 may be located in the recording space and be scanned and recorded in model states along with the trainer. In particular, the trainer 504 and objects 508 may be moved such that the position and orientation thereof is different from one model state to the next.

As shown in FIG. 5B, the trainer 504 and objects 508 are represented as virtual objects in a combined model by headsets 110 worn by a trainee 510 in the playback space. In some embodiments, only the trainer 504 and selected objects are displayed in the headset with other features of the recording space being filtered out. The headsets 110 may display to the trainee both the representations of the trainer 504 and objects 508 as well as objects 512 located in the playback space as well as any portions of the trainee that is within the field of view of the headset 110. In particular, the headset 110 may include a camera that generates an image of the field of view of the headset. The representations of the trainer 504 and objects 508 may be superimposed on this image. Alternatively, the playback space may include scanners 108a, 108b and a camera 108c. A current model of the playback space may be generated (see FIG. 3) and combined with the model state of the recording space. A rendering of this combined model may then be displayed in the headset 110 from the viewpoint of the headset 110.

Figure 6:
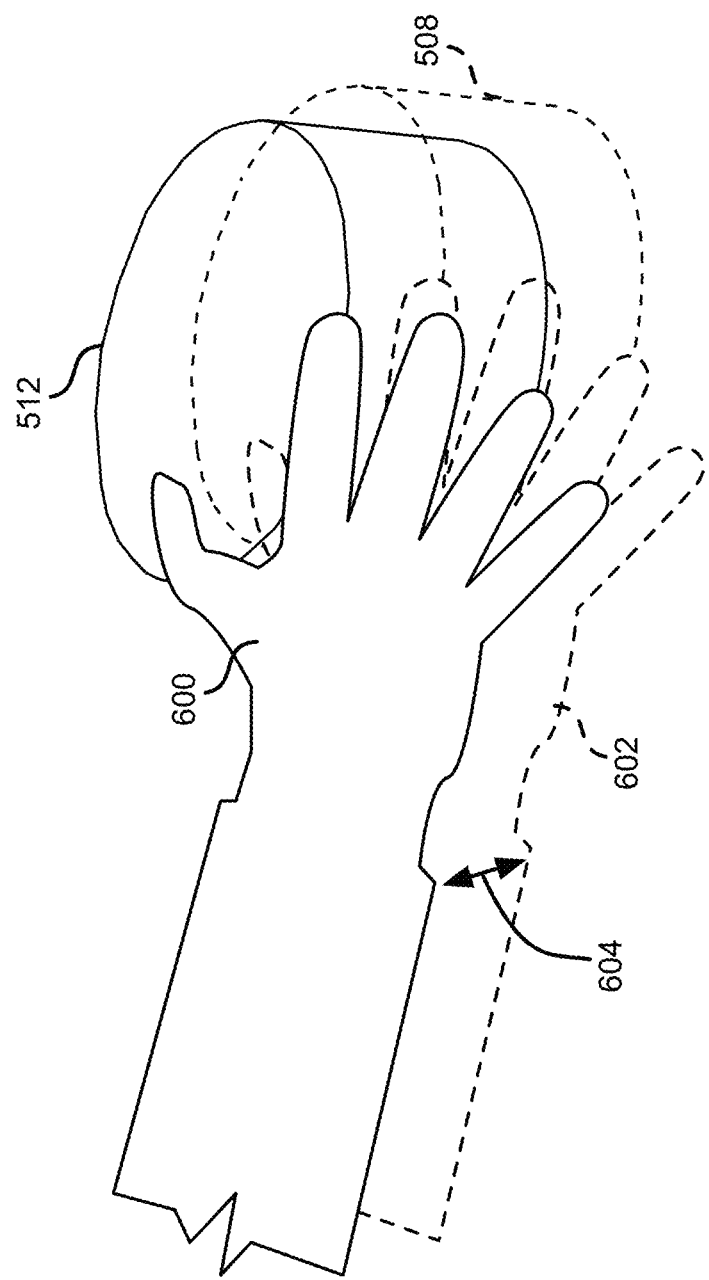
FIG. 6 is a diagram representations the comparison of virtual and actual actions in accordance with an embodiment of the present invention.

FIG. 6 illustrates the comparison of the location of a trainee's hand 600 or an object 512 in the playback space to the trainer's hand 602 or an object 508 in the recording space for a model state as described above with respect to steps 410-416. The position and orientation of the hand 602 may be compared to the position and orientation of the representation 602 of the trainer's hand in the model state. An offset 604, which may include an angular and/or translational offset is then calculated and compared to a threshold. If the threshold is exceeded, an alert is generated. Similarly, an offset between the object 512 and a virtual representation of object 508 may be compared in a similar manner. The objects 512, 508 may be pieces of a device being assembled or other materials that are manipulated as part of a task.

In some embodiment, the object 512 is not present. Instead, a virtual representation of the object 512 is presented and its location within the playback space is manipulated in response to user's movements. Accordingly, rather than comparing the location of a real object 512 to a virtual object 508, a virtual object 512 is compared to a virtual object 508.

In some embodiments, contact with the virtual object 512 may be simulated using haptic device. For example, in response to a user's hand being placed at a position corresponding to the virtual object 512, actuators may simulate touching of the of the virtual object. The intensity of the activation of the haptic device 108e may be proportional to the hand's relative velocity to the virtual object 512.

Although FIG. 6 is described with respect to a user's hand, the position of other body parts (foot, arm, leg, etc.) of the trainer may be compared to those of the trainee in the same manner.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method comprising:
   performing, by a computer system, a sequence of three-dimensional scans of a recorded region over a time period, wherein the computer system includes a first scanning device and one or more second scanning devices, the one or more second scanning devices having faster scanning times and smaller fields of view than the first scanning device, wherein the performing of the sequence of three-dimensional scans of the recorded region over the time period comprises, by the computer system:
      performing a first scan of the recorded region using the first scanning device;
      performing a plurality of second partial scans of the recorded region subsequent to the first scan using the one or more scanning devices; and
      combining the plurality of second partial scans with the first scan to obtain a plurality of second scans, the first scan and plurality of second scans being the sequence of three-dimensional scans of the recorded region;
   receiving, by the computer system, a sequence of images recorded by a camera over the time period, the camera having the recorded region in a field of view thereof;
   mapping, by the computer system, each image of the sequence of images to a corresponding scan of the sequence of three-dimensional scans to obtain a three-dimensional state of the recorded region;
   sequentially rendering, by the computer system, the three-dimensional states by, for each three-dimensional state:
      detecting, by the computer system, a current location and orientation of a user in a playback region including one of the recorded region and a different region;
      determining, by the computer system, a current viewpoint of the user from the current location and orientation of the user;
      mapping, by the computer system, the each three-dimensional state to the playback region; and
      rendering, by the computer system, in a display device, the each three-dimensional state in a display device from the current viewpoint in combination with an image of the playback region from the current viewpoint.

2. The method of claim 1, wherein performing the plurality of second partial scans comprises performing each partial scan of the plurality of second partial scans in response to sensing movement in the field of view of one of the one or more second scanning devices.

3. The method of claim 2, wherein the first scanning device is a laser scanner and the one or more second scanning devices are optical scanners.

4. The method of claim 1, wherein performing the sequence of three-dimensional scans of the recorded region over the time period comprises recording a trainer moving within the recorded region during the time period.

5. The method of claim 1, wherein the display device is a headset worn by the user and wherein detecting the current location and orientation of the user in the playback region comprises detecting a current location and orientation of the headset.

6. A method comprising:
   performing, by a computer system, a sequence of three-dimensional scans of a recorded region over a time period;
   receiving, by the computer system, a sequence of images recorded by a camera over the time period, the camera having the recorded region in a field of view thereof;
   mapping, by the computer system, each image of the sequence of images to a corresponding scan of the sequence of three-dimensional scans to obtain a three-dimensional state of the recorded region;
   sequentially rendering, by the computer system, the three-dimensional states by, for each three-dimensional state:
      detecting, by the computer system, a current location and orientation of a user in a playback region including one of the recorded region and a different region;
      determining, by the computer system, a current viewpoint of the user from the current location and orientation of the user;
      mapping, by the computer system, the each three-dimensional state to the playback region; and
      rendering, by the computer system, in a display device, the each three-dimensional state in a display device from the current viewpoint in combination with an image of the playback region from the current viewpoint;
   wherein performing the sequence of three-dimensional scans of the recorded region over the time period comprises recording a trainer moving within the recorded region during the time period; and
   wherein sequentially rendering the three-dimensional states further comprises, for each three-dimensional state:
      scanning the user;
      comparing a location of at least one portion of the user to at least one corresponding portion of the trainer in the each three-dimensional state; and
      generating an alert if the location of the at least one portion is more than a threshold distance from the at least one corresponding portion.

7. The method of claim 6, wherein the at least a portion of the user is the user's hands.

8. The method of claim 6, wherein:
the computer system further comprises a haptic feedback device worn by the user, the method further comprising:
detecting proximity of the haptic feedback device to a virtual object in one of the three dimensional states; and
in response to detecting proximity of the haptic feedback device to the virtual object in the one of the three dimensional states, causing the haptic feedback device to generate a perceptible output.

9. The method of claim 8, wherein an intensity of the perceptible output is proportional to a velocity of the haptic feedback device upon detecting proximity of the haptic feedback device to the virtual object.

10. A system comprising:
at least one scanning device;
at least one camera;
a display device;
a computer system including one or more processing devices and one or more memory devices operably coupled to the one or more processing devices, the one or more memory devices storing executable code effective to cause the one or more processing devices to:
perform a sequence of three-dimensional scans of a recorded region over a time period using the at least one scanning device;
receive a sequence of images recorded by the at least one camera over the time period, the at least one camera having the recorded region in a field of view thereof;
map each image of the sequence of images to a corresponding scan of the sequence of three-dimensional scans to obtain a three-dimensional state of the recorded region;
sequentially render the three-dimensional states by, for each three-dimensional state:
detect a current location and orientation of a user in a playback region including one of a recorded region and a different region;
determine a current viewpoint of the user from the current location and orientation of the user;
map the each three-dimensional state to the playback region; and
render in a display device, the each three-dimensional state in the display device from the current viewpoint in combination with an image of the playback region from the current viewpoint;
wherein:
the at least one scanning device includes a first scanning device and one or more second scanning devices, the one or more second scanning devices having faster scanning times and smaller fields of view than the first scanning device;
wherein the executable code is further effective to cause the one or more processors to perform the sequence of three-dimensional scans of the recorded region over the time period by:
performing a first scan of the recorded region using the first scanning device;
performing a plurality of second partial scans of the recorded region subsequent to the first scan using the one or more scanning devices; and
combining the plurality of second partial scans with the first scan to obtain a plurality of second scans, the first scan and plurality of second scans being the sequence of three-dimensional scans of the recorded region.

11. The system of claim 10, wherein the executable code is further effective to cause the one or more processors to perform the plurality of second partial scans by performing each partial scan of the plurality of second partial scans in response to sensing movement in the field of view of one of the one or more second scanning devices.

12. The system of claim 11, wherein the first scanning device is a laser scanner and the one or more second scanning devices are optical scanners.

13. The system of claim 10, wherein the executable code is further effective to cause the one or more processors to perform the sequence of three-dimensional scans of the recorded region over the time period by recording a trainer moving within the recorded region during the time period.

14. The system of claim 10, wherein the display device is a headset worn by the user and wherein the executable code is further effective to cause the one or more processors to detect the current location and orientation of the user in the playback region by detecting a current location and orientation of the headset.

15. A system comprising:
at least one scanning device;
at least one camera;
a display device;
a computer system including one or more processing devices and one or more memory devices operably coupled to the one or more processing devices, the one or more memory devices storing executable code effective to cause the one or more processing devices to:
perform a sequence of three-dimensional scans of a recorded region over a time period using the at least one scanning device;
receive a sequence of images recorded by the at least one camera over the time period, the at least one camera having the recorded region in a field of view thereof;
map each image of the sequence of images to a corresponding scan of the sequence of three-dimensional scans to obtain a three-dimensional state of the recorded region;
sequentially render the three-dimensional states by, for each three-dimensional state:
detect a current location and orientation of a user in a playback region including one of a recorded region and a different region;
determine a current viewpoint of the user from the current location and orientation of the user;
map the each three-dimensional state to the playback region; and
render in a display device, the each three-dimensional state in the display device from the current viewpoint in combination with an image of the playback region from the current viewpoint;
wherein the executable code is further effective to cause the one or more processors to perform the sequence of three-dimensional scans of the recorded region over the time period by recording a trainer moving within the recorded region during the time period; and
wherein the executable code is further effective to cause the one or more processors to sequentially render the three-dimensional states by, for each three-dimensional state:
scanning the user;
comparing a location of at least one portion of the user to at least one corresponding portion of the trainer in the each three-dimensional state; and generating an alert if the location of the at least one portion is more than a threshold distance from the at least one corresponding portion.

16. The system of claim 15, wherein the at least a portion of the user is the user's hands.

17. The system of claim 15, further comprising a haptic feedback device worn by the user;
wherein the executable code is further effective to cause the one or more processors to:
detect proximity of the haptic feedback device to a virtual object in one of the three dimensional states; and
in response to detecting proximity of the haptic feedback device to the virtual object in the one of the three dimensional states, cause the haptic feedback device to generate a perceptible output.

18. The system of claim 17, wherein the executable code is further effective to cause the one or more processors to cause an intensity of the perceptible output to be proportional to a velocity of the haptic feedback device upon detecting proximity of the haptic feedback device to the virtual object.

\* \* \* \* \*